United States Patent [19]
Vuillemot

[11] 3,884,055
[45] May 20, 1975

[54] TRAILER HITCH LOCK
[76] Inventor: Dale F. Vuillemot, 11513 Lewis Rd., Clio, Mich. 48420
[22] Filed: Sept. 27, 1973
[21] Appl. No.: 401,387

[52] U.S. Cl. .................................. 70/58; 280/507
[51] Int. Cl. ............................................ E05b 73/00
[58] Field of Search ................. 70/14, 57, 58, 258; 280/507, 511, 514

[56] References Cited
UNITED STATES PATENTS

| | | | |
|---|---|---|---|
| 2,571,349 | 10/1951 | Eckles | 70/14 |
| 3,237,969 | 3/1966 | Geresy | 280/507 |
| 3,391,555 | 7/1968 | Mamo | 70/258 |
| 3,434,741 | 3/1969 | Grant | 280/507 |

Primary Examiner—Robert L. Wolfe
Attorney, Agent, or Firm—Ernest I. Gifford

[57] ABSTRACT

A theft deterrent trailer hitch lock device to lockably obstruct the socket portion of a trailer hitch, the device having an elongated plate which closes at least a portion of the opening into the socket, a plug which is inserted into the trailer hitch socket and a bar which can be positioned over the trailer hitch and locked in place so that the socket portion of the trailer hitch is contained between the bar and the elongated plate.

10 Claims, 8 Drawing Figures

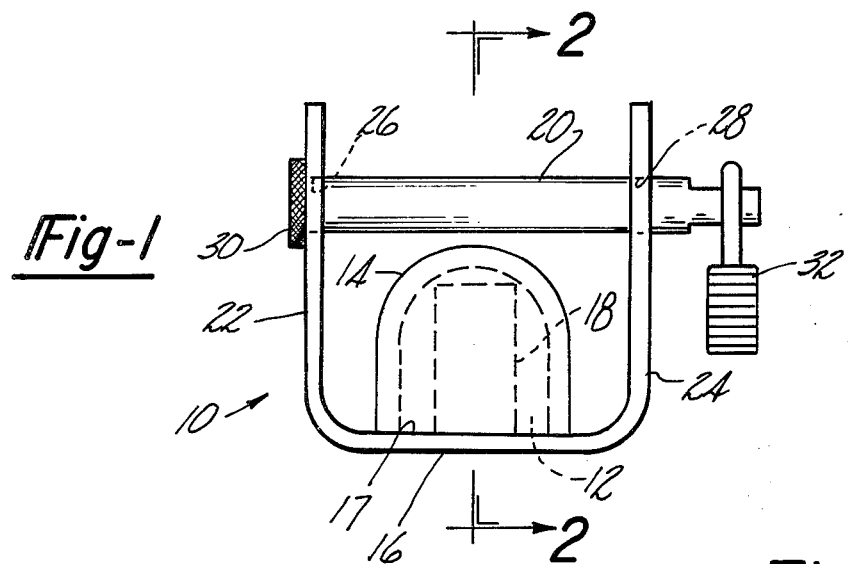
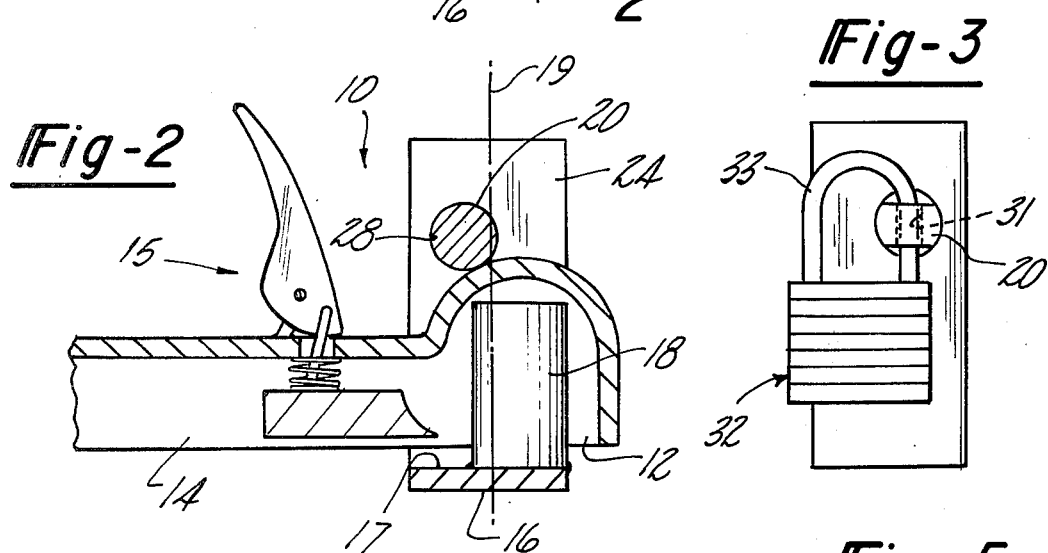
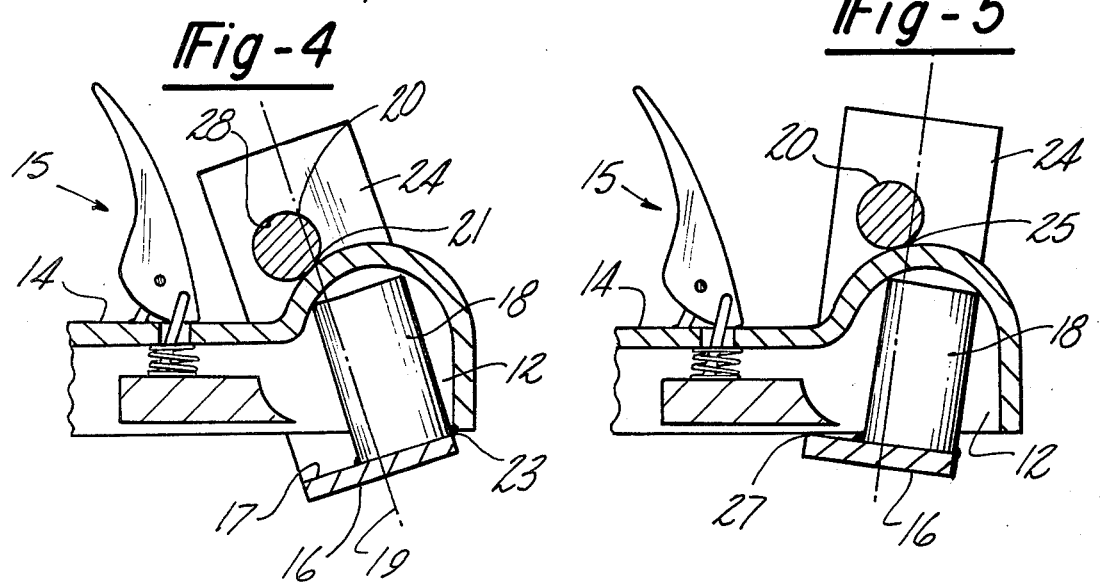

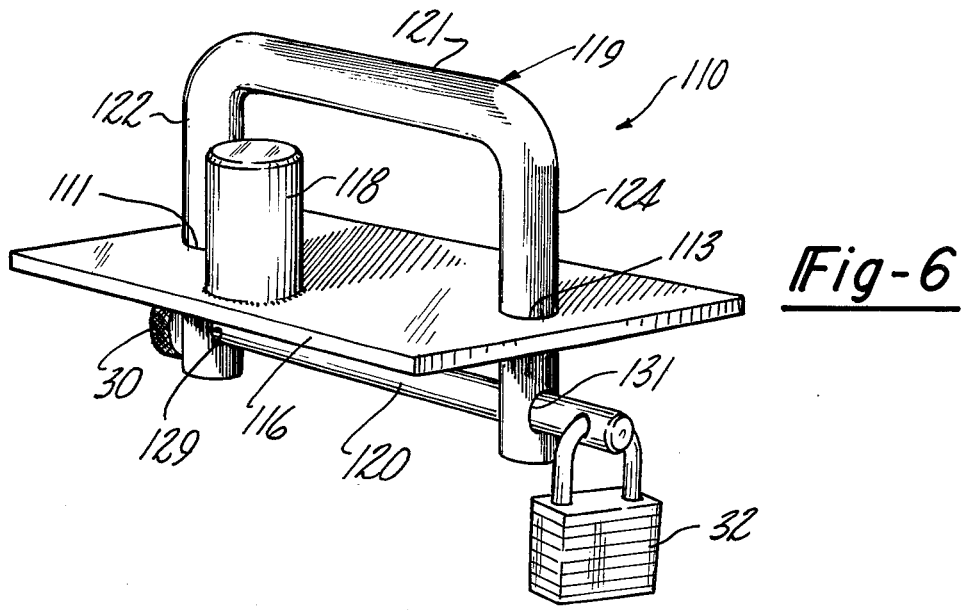
Fig-6
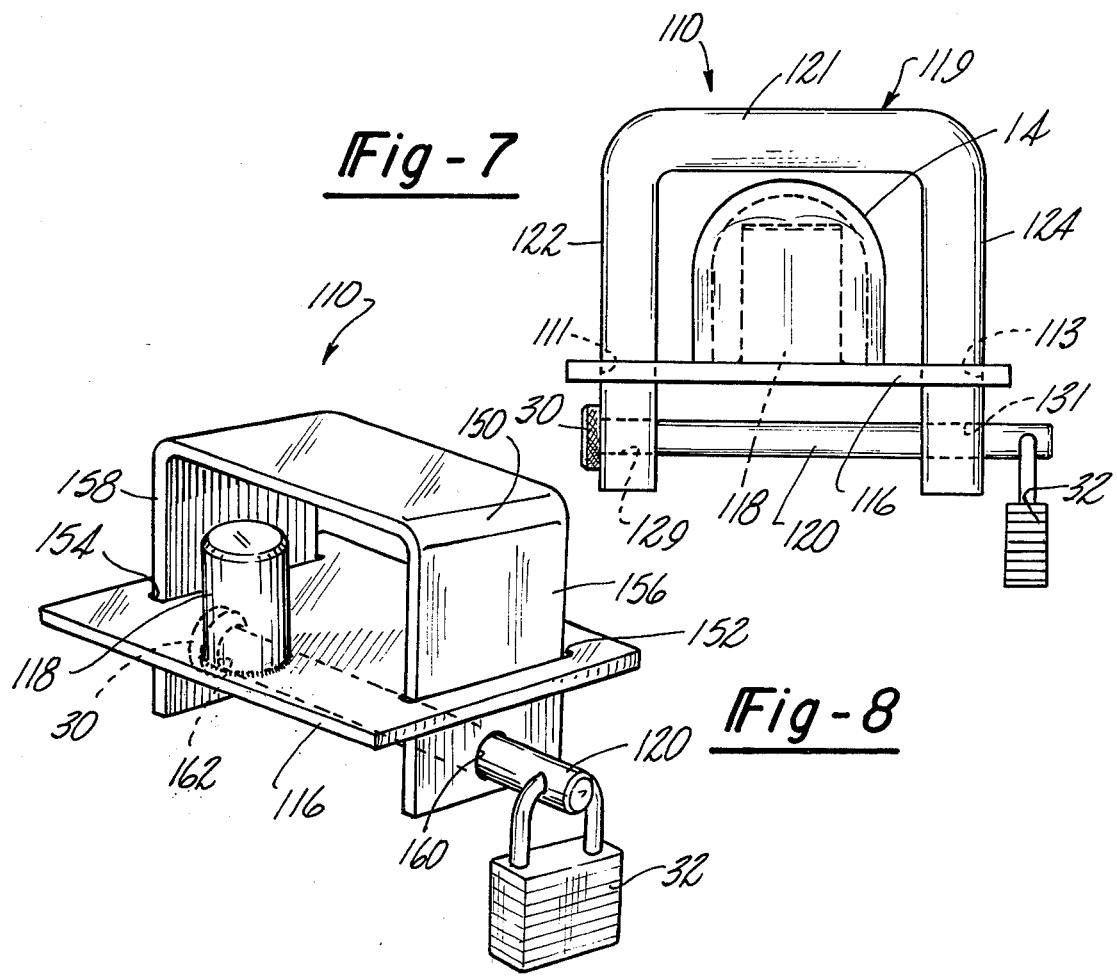
Fig-7
Fig-8

TRAILER HITCH LOCK

BACKGROUND OF THE INVENTION

I. Field of the Invention

The present invention relates to locking devices for trailer hitches to prevent unauthorized towing of the trailer to which the hitch is attached. In particular, the invention pertains to a trailer hitch locking device which closes the socket portion of the hitch associated with a trailer towing tongue to prevent the insertion therein of a hitch ball affixed to a trailer hitch of a towing vehicle.

II. Description of the Prior Art

Many trailer hitches for boat trailers, campers, and the like employ a standard hitch mechanism wherein a socket on the trailer hitch engages a standard size ball joint on the towing vehicle. While this arrangement has many advantages, such as interchangeability of trailer hitches, it also has a great disadvantage, namely that any person having a standard ball joint on his vehicle may easily steal an unattended and unattached trailer by simply attaching the trailer to the ball joint on his vehicle and towing the trailer away.

In order to combat this type of trailer theft, there are a number of prior art trailer hitch locks. One such lock is disclosed in U.S. Pat. No. 3,605,457 issued on Sept. 20, 1971 to W. D. Foster, which has a box-like housing having one hinged and lockable wall and a trailer hitch ball. The hitch ball is inserted in the hitch socket portion of the trailer tongue and the housing is installed over the socket portion enclosing it therein, and the housing is then locked. The disadvantages of this device are its relatively complicated structure, and the fact that since it must enclose a greater portion of the trailer tongue than just the ball socket, it may not universally fit all trailer hitches.

Another prior art device disclosed in U.S. Pat. No. 3,434,741 issued on Mar. 25, 1969 to W. H. Grant includes a hitch ball affixed to highed plates. The hitch ball is inserted in the socket of a trailer tongue and the two hinged plates are brought together in a horizontal plane to receive the flanges of a trailer hitch tongue. The disadvantage of this device is that it is not universally adaptable to various trailer hitch tongues. It can only be used on trailer hitch tongues having flanges, and even at that, the shape of the two plates must be specially designed for trailer tongues having a lateral flange, but having differently angled frame members which comprise the trailer tongue.

A further prior art device disclosed in U.S. Pat. No. 3,233,913 issued on Feb. 8, 1966 to T. P. Brown includes a false hitch ball type member which fits into the socket of a trailer hitch. This false hitch ball member is locked into the socket by the trailer hitch latching mechanism, which is in turn locked by a padlock. the device includes a length of chain affixed at one end to the false hitch ball and a ring, which is larger in diameter than the hitch ball, attached to its other end. The chain with the ring can be utilized for towing the trailer short distances. The disadvantage of this device is that the chain must be specifically designed to enable the towing of the trailer short distances without removing the false ball type element from the trailer tongue socket, and it requires storing when not in use.

Yet a further prior art trailer hitch locking device is disclosed in U.S. PAT. No. 2,571,349 issued on Oct. 16, 1951 to N. Eckles, said device having a support with a plug attached thereto, the plug attached thereto, the plub being of a size to snugly fit within the socket of the trailer hitch, and a strap pivotally attached at one end to the support and being locable to the support at its other end. To lock the trailer hitch, the support is placed beneath the hitch to cover the opening into the socket of the hitch, the plug being inserted into the socket. The strap is pivotally disposed over the hitch and locked to the support. The support is positioned tightly against the bottom of the hitch, the strap fits tightly over the top of the hitch and the plug fits snugly within the socket of the hitch. The close fit of the components of the Eckles device with respect to the trailer hitch are important to prevent the device from being removed from the hitch by merely twisting it or rotating it relative to the hitch. A drawback of this device is that the required tight fit of the components about and in the trailer hitch also limits its universal use for trailer hitches of various sizes, and, in addition, the requirement of holding the proper dimensional tolerances increaases the cost of manufacture.

No prior art device known to me provides the combination of attributes of present invention, viz., a simple, inexpensive trailer hitch locking device which is substantially universally usable on trailer hitches of various sizes and shapes.

SUMMARY OF THE INVENTION

The present invention in essence is the provision of a theft deterrent device which lockably obstructs and closes the ball socket of a trailer hitch tongue, the device having an elongated plate to close the opening into the socket, a plug affixed to the plate which fits into and occupies the socket, the plut being oriented to one side of the vertical centerline of the elongated plate, and a lockable bar which fits over the trailer hitch on the opposite side of the socket from the elongated plate, the lockable bar being oriented to the opposite side of the vertical centerline of the elongated plate from that side thereof to which the plug is oriented. The staggered orientation of the plug and lockable bar with respect to the vertical centerline of the elongated plate allows for a dimension between the elongated plate and the lockable bar large enough to receive therebetween trailer hitch sockets of almost any size and shape, while, at the same time, preventing removal of the theft deterrent device by twisting it or rotating it relative to the hitch socket.

BRIEF DESCRIPTION OF THE DRAWINGS

Three possible embodiments of the invention are illustrated in the accompanying drawings, wherein like numerals refer to like parts throughout the several views, and in which:

FIG. 1 is a front elevational view of one embodiment of the theft deterrent device;

FIG. 2 is a side elevational view of the device taken along line 2–2 of FIG. 1;

FIG. 3 is a side elevational view of the device as seen from the right side of FIG. 1;

FIG. 4 is a side sectional view of the device of FIG. 2 installed on a trailer hitch and showing the device rotated rearwardly with respect to the trailer hitch;

FIG. 5 is a side sectional view of the device of FIG. 2 installed on a trailer hitch and showing the device rotated forwardly with respect to the trailer hitch;

Fig. 6 is a perspective view of a second embodiment of the theft deterrent device of the present invention;

FIG. 7 is a front elevational view of the embodiment shown in FIG. 6; and

FIG. 8 is a perspective view illustrating yet another modification of the theft deterrent device.

DETAILED DESCRIPTION OF THE INVENTION

The preferred embodiment of the theft deterrent device of the present invention, generally denoted as 10, is illustrated in FIGS. 1 and 2 as lockingly engaging a socket 12 of a trailer towing tongue 14. The device 10 includes an elongated plate 16 and a generally cylindrical plug 18 affixed to the upper surface 17 of the plate 16 by welding or the like. Two upwardly extending side arms 22 and 24 are disposed at the connected to opposite ends of the elongated plate 16 in a generally parallel relationship. These arms 22, 24 may be separate componets attached to the plate 16 by welding or the like or, as illustrated, may be integral with the plate 16. In addition, each arm 22, 24 includes at least one hole 26, 28, respectively, near its free end, these holes being coaxial or in line with each other. A cylindrical bar or rod 20 is axially receivable through the holes 26, 28 in the arms 22, 24, respectively, such that the rod 20 is in a spaced apart parallel relationship to the plate 16. The rod 20 has an enlarged head 30 at one end which is larger than the holes 26, 28 to prevent the rod 20 from passing completely through the holes 26, 28, and it has a hole 31 (FIG. 3) at the other end to receive the bolt 33 of alock 32 therethrough. The rod 20 is preferably heat treated to increase its hardness.

As can be best seen in FIG. 2, the plug 18 is located to one side of the vertical centerline 19 of the elongated plate 16, while each of the holes 26 and 28 in the arms 22 and 24, respectively, and therefore the rod 20, is located on the opposite side of the vertical centerline 19 of the plate 16. When the device 10 is installed on the trailer towing tongue 14, the plug 18 is inserted into the socket 12 of the towing tongue 14, after which the rod 20 is inserted through holes 26 and 28 until the enlarged head 30 of the rod 20 abuts against arm 22 or 24 to captively retain the plug 18 in the hitch socket 12 between the rod 20 and the elongated plate 16. The bold 33 of the lock 32 is then inserted through the aperture 31 in rod 20 to lock the rod 20 in the holes 26 and 28. The tongue 14 is illustrated as including conventional ball capturing mechanism 15.

The offset relationship between the plug 18 and the rod 20 with respect to the vertical centerline 19 of the elongated plate 16 serves the purpose of preventing the removal of the theft deterrent device by merely twisting or rotating it relative to the trailer hitch. The function of this offset is best illustrated FIGS. 4 and 5, which is described hereinbelow.

FIG. 4 shows the device 10 being rotated toward the rear of the trailer hitch tongue 14 as in an attempt to remove the device from the hitch without first removing the locked rod 20. Because of the offset orientation of the plug 18 on one side of the vertical centerline of the plate 16 and the bar 20 on the opposite side thereof, an interference is created between the top of the hitch and the rod 20 as illustrated at 21 and, simultaneously, an interference is created between the bottom of the hitch and the plug 18 of illustrated at 23.

FIG. 5 shows the device 10 being rotated toward the front of the trailer hitch tongue 14, also as in an attempt to remove the device without first removing the locked rod 20. Again, the offset orientation of the plug 18 and rod 20 on opposite sides of the vertical centerline 19 of the plate 16 creates an interference between the rod 20 and the top of the hitch as indicated at 25 and, simultaneously, an interference between the plate 16 and the bottom of the hitch as indicated at 27.

FIGS. 6 and 7 illustrate another embodiment of a theft deterrent device of the present invention, generally denoted as 110, and shown as installed on a trailer hitch 14 in FIG. 7. The device 110 includes an elongated plate 116 having a pair of spaced holes 111 and 113 therethrough and a generally cyindrical plug 118 affixed to the plate 116 by welding or the like. As in the first mentioned embodiment, the plug 118 is located to one side of the vertical centerline of the elongated plate 116, while the holes 111 and 113 are located to the opposite side of the vertical centerline of the plate 116, thereby creating an offset relationship between the holes 111 and 113 and plug 118 to prevent removal as described above with respect to the embodiment of FIGS. 1-5.

Two downwardly extending and cylindrical side arms 122 and 124 are disposed at the connected to opposite ends of a bar or rod 121 to form therewith a generally U-shaped locking member 119. These arms 122 and 124 may be separate components attached to the rod 121 as by welding or, as illustrated, may be integral with the rod 121. Further, each arm 122, 124 includes at least one hole 129, 131, respectively, near its free end and in axial alignment with each other. The holes 111 and 113 in the plate 116 are adapted to receive the side arms 122 and 124 therethrough, such that after the side arms 122 and 124 are inserted through the holes 111 and 113, respectively, the rod 120 is maintained in spaced apart parallel relationship from the plate 116 and is also located on the opposite side of the vertical centerline of the plate 116 from the side on which the plug 118 is located.

When installed on a hitch, the plug 118 is inserted into the socket 12 of the trailer hitch 14 and the U-shaped locking member 119 is inserted through holes 111 and 113 to captively retain the plug 118 in the socket 12 between the U-shaped locking member 112 and the plate 116. A rod 120, substantially identical to the previously described rod 20, is then axially received through the holes 129 and 131 to constrain the U-shaped locking member 119 to the plate 116. In operation, the offset bar 121 (i.e. the central portion of the U-shaped locking member 119) performs the same function as the rod 20 in the first mentioned embodiment, namely to act as a bearing surface to retain the plug 118 in the socket 12 and prevent unauthorized removal of the device 110 from the trailer socket 12.

Yet a further modification of the present invention is illustrated in FIG. 8 in which the previously described cylindrical locking member 119 (FIGS. 6 and 7) is replaced by a generally flat U-shaped locking member 150. Appropriate slots 152 and 154 are provided through the plate 116 (replacing the previously described holes 111 and 113 in FIGS. 6 and 7) to receive the downwardly depending side arms 156 and 158 of the U-shaped locking member 150. As in the previously described embodiments of the present invention, the vertical centerline of the locking member 150 is offset from the vertical centerline of the plug 118 to prevent unauthorized removal of the device 110 from the trailer hitch. As has been described in FIGS. 6 and 7, the rod 120 is inserted through two apertures 160 and 162 in the free ends of the side arms 156 and 158 to retain the locking member 150 to the plate 116. Likewise, the lock 32 is provided to prevent unauthorized removal of the rod 120 from the U-shaped locking member 150. Again the parts and especially the rod 120 are preferably heat treated to harden the metal and to thereby deter cutting.

It should be again expressly pointed out that the offset orientation of the plug and the bar allows the distance between the elongated plate and the bar to be substantially larger than the distance between the bottom of the trailer hitch socket and the top of the trailer hitch socket. Therefore, a single theft deterrent device can be used substantially universally on trailer hitches of various sizes.

The foregoing detailed descriptions are given primarily for clarity of understanding and no unnecessary limitations should be understood therefrom for other modifications will be obvious to those skilled in the art upon reading this disclosure and may be made without department from the spirit of the invention or the scope of the appended claims.

I claim:

1. A theft deterrent device to lockably obstruct the socket of a trailer hitch, comprising:
    an elongated plate to traverse the opening into said socket;
    a plug member disposed to one side of the vertical centerline of said plate and affixed thereto, said plug member fitting within said socket;
    a bar mounted to said device in parallel spaced relationship to said elongated plate and being disposed to the opposite side of the vertical centerline of said plate from that side thereof to which said plug is disposed so that when said theft deterrent device is installed on said trailer hitch said bar is located generally over said trailer hitch, said elongated plate is located under said trailer hitch closing the opening into said socket and said plug member is inserted in said socket, the orientation of said plug and said bar on opposite sides of the vertical centerline of said plate preventing removal of said device by merely rotating said theft deterrent device relative to said hitch; and
    means to lock said theft deterrent device to said trailer hitch.

2. The theft deterrent device as defined in claim 1, including:
    two extending side arms connected at opposite ends of said elongated plate;
    each of said side arms having at least one hole near the other end, said holes in said arms being coaxial, and the axis of said holes being disposed to the opposite side of the vertical centerline of said elongated plate from that side thereof to which said plug is disposed; and
    said bar being axially receivable in said holes in said side arms to extend between said side arms and said bar having a hole in one end to receive a bolt of a lock, the other end of said bar being larger than said holes in said arms to prevent said bar from passing through said holes in said arms.

3. A theft deterrent device as defined in claim 2 wherein said elongated plate and said side arms are integral.

4. A theft deterrent device as defined in claim 3 wherein said bar is generally circular in cross section.

5. A theft deterrent device as defined in claim 4 wherein:
    said plug member is a right circular cylinder; and
    said plug member is affixed to said elongated plate by welding.

6. A theft deterrent device as defined in claim 1 including:
    a generally U-shaped member comprising said bar and two extending arms, each of said arms being connected at one end to a different one of the ends of said bar;
    each of said extending arms having at least one hole near its other end;
    means defining at least one hole near each end of said elongated plate, said holes in said plate being disposed to the opposite side of the vertical centerline of said plate from that side thereof to which said plug is disposed, each hole to receive therethrough a different one of said arms of said U-shaped member; and
    means to lock said U-shaped member to said elongated plate.

7. A theft deterrent device as defined in claim 6 wherein:
    said holes through said arms of said U-shaped member are coaxial; and
    said means to lock said U-shaped member to said elongated plate includes a bar axially receivable through said coaxially disposed holes in said arms so as to extend between said extending arms, said bar having a hole therethrough near one of its ends to receive a bolt of a lock, and the other end of said bar being larger than said holes in said extending arms to prevent said bar from passing through said holes in said extending arms.

8. A theft deterrent device as defined in claim 2 wherein said bar and two extending arms of said U-shaped member are integral.

9. A theft deterrent device as defined in claim 8 wherein said bar is generally circular in cross section.

10. A theft deterrent device as defined in claim 9 wherein said bar and said extending arms of said U-shaped member are generally circular in cross section.

* * * * *